US012646137B2

(12) United States Patent
Takeshita

(10) Patent No.: US 12,646,137 B2
(45) Date of Patent: Jun. 2, 2026

(54) MEDICAL IMAGE DISPLAY DEVICE

(71) Applicant: JVCKENWOOD Corporation, Yokohama (JP)

(72) Inventor: Hiroshi Takeshita, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 251 days.

(21) Appl. No.: 18/212,903

(22) Filed: Jun. 22, 2023

(65) Prior Publication Data

US 2024/0104688 A1     Mar. 28, 2024

(30) Foreign Application Priority Data

Sep. 22, 2022     (JP) ................................. 2022-151730

(51) Int. Cl.
| | |
|---|---|
| *G06T 3/40* | (2024.01) |
| *G06F 3/01* | (2006.01) |
| *G06T 7/11* | (2017.01) |
| *G06T 11/60* | (2006.01) |

(52) U.S. Cl.
CPC ................ *G06T 3/40* (2013.01); *G06F 3/013* (2013.01); *G06T 7/11* (2017.01); *G06T 11/60* (2013.01); *G06T 2207/20021* (2013.01); *G06T 2207/20221* (2013.01); *G06T 2207/30004* (2013.01); *G06T 2207/30241* (2013.01); *G06T 2210/41* (2013.01)

(58) Field of Classification Search
CPC ............. G06T 3/40; G06T 2207/30204; G06T 2207/30004; G06T 2210/41; G09G 5/377
See application file for complete search history.

(56) References Cited

U.S. PATENT DOCUMENTS

| | | | | |
|---|---|---|---|---|
| 10,922,897 | B2 * | 2/2021 | Maeda | .................. A61B 6/466 |
| 2020/0126297 | A1 * | 4/2020 | Tian | ...................... G06T 7/0012 |
| 2024/0233124 | A1 * | 7/2024 | Song | ...................... G06T 7/136 |

FOREIGN PATENT DOCUMENTS

| | | | |
|---|---|---|---|
| JP | 2011-112523 A | 6/2011 |
| JP | 2015-095050 A | 5/2015 |
| JP | 2015-118448 A | 6/2015 |
| JP | 2017-102687 A | 6/2017 |

OTHER PUBLICATIONS

Japanese Office Action issued on Mar. 17, 2026 in the counterpart application No. 2022-151730.

* cited by examiner

*Primary Examiner* — Antonio A Caschera
(74) *Attorney, Agent, or Firm* — Nath, Goldberg & Meyer; Jerald L. Meyer

(57) ABSTRACT

An image enlargement unit enlarges a partial area of a pathology image. A display area acquisition unit acquires a display area indicating the partial area enlarged by the image enlargement unit. A display area image generation unit generates an enlarged map image in which an enlarged display area of the pathology image is drawn, based on the display area acquired by the display area acquisition unit. A pointer position acquisition unit acquires a position of a pointer that is superimposed on the pathology image and displayed. A viewing position image generation unit generates, as a viewing position map image, a pointer map image indicating a movement trajectory of when the pointer moves on the pathology image, based on the position of the pointer. An image compositing unit superimposes the enlarged map image and the viewing position map image on the pathology image.

3 Claims, 15 Drawing Sheets

PT0

| | | | | | | | M21 |
|---|---|---|---|---|---|---|---|
| 1 | 1 | 1 | 1 | 1 | 1 | 1 | 0 |
| 1 | 1 | 1 | 1 | 1 | 1 | 1 | 1 |
| 1 | 1 | 1 | 1 | 0 | 1 | 1 | 0 |
| 1 | 1 | 1 | 1 | 0 | 0 | 0 | 0 |
| 0 | 1 | 0 | 0 | 0 | 0 | 0 | 0 |
| 0 | 1 | 1 | 0 | 0 | 0 | 0 | 0 |
| 0 | 0 | 0 | 1 | 1 | 0 | 0 | 0 |
| 0 | 0 | 0 | 0 | 0 | 0 | 0 | 0 |

MEDICAL IMAGE DISPLAY DEVICE

CROSS REFERENCE TO RELATED APPLICATION

This application is based upon and claims the benefit of priority under 35 U.S.C. § 119 from Japanese Patent Application No. 2022-151730 filed on Sep. 22, 2022, the entire contents of which are incorporated herein by reference.

BACKGROUND

The present disclosure relates to a medical image display device.

In a medical setting, a doctor may determine whether a lesion is present by looking at a pathology image. In the past, a method has been adopted in which a person determines whether a lesion is present by looking at a thinly sliced pathology specimen placed on a slide by using a microscope. In recent years, a method has been adopted in which an image of a pathology specimen placed on a slide is captured by using a scanner, the image is converted into a pathology image that is a digital image, the pathology image is displayed by a medical image display device, and whether a lesion is present is determined.

SUMMARY

When a person who determines whether a lesion is present (hereinafter referred to as a "determiner"), such as a doctor, is to determine whether a lesion is present by looking at a pathology image displayed on a medical image display device, if the determiner determines whether the lesion is present without looking at a partial area out of the entire area of the pathology image, there is a risk of missing a lesion. Therefore, it is desirable to make it easy to confirm which area out of the entire area of the pathology image the determiner is looking at and which areas the determiner is not looking at.

A first aspect of one or more embodiments provides a medical image display device including: an image enlargement unit that enlarges a partial area of a pathology image displayed on a display panel; a display area acquisition unit that acquires a display area indicating the partial area enlarged by the image enlargement unit; a display area image generation unit that generates an enlarged map image in which an enlarged display area of the pathology image is drawn, based on the display area acquired by the display area acquisition unit; a pointer position acquisition unit that acquires a position of a pointer that is superimposed on the pathology image and displayed; a viewing position image generation unit that generates, as a viewing position map image, a pointer map image indicating a movement trajectory of when the pointer moves on the pathology image, based on the position of the pointer acquired by the pointer position acquisition unit; and an image compositing unit that superimposes the enlarged map image and the viewing position map image on the pathology image.

A second aspect of one or more embodiments provides a medical image display device including: an image enlargement unit that enlarges a partial area of a pathology image displayed on a display panel; a display area acquisition unit that acquires a display area indicating the partial area enlarged by the image enlargement unit; a display area image generation unit that generates an enlarged map image in which an enlarged display area of the pathology image is drawn, based on the display area acquired by the display area acquisition unit; a line-of-sight detection device that detects a line-of-sight of a person who looks at the pathology image displayed on the display panel and judges the pathology image; a line-of-sight position acquisition unit that acquires a position of the line-of-sight of the person detected by means of the line-of-sight detection device; a viewing position image generation unit that generates, as a viewing position map image, a line-of-sight position map image indicating a movement trajectory of when the position of the line-of-sight moves on the pathology image, based on the position of the line-of-sight acquired by means of the line-of-sight position acquisition unit; and an image compositing unit that superimposes the enlarged map image and the viewing position map image on the pathology image.

DETAILED DESCRIPTION

A medical image display device according to each embodiment will be described below with reference to the accompanying drawings.

First Embodiment

Figure 1:
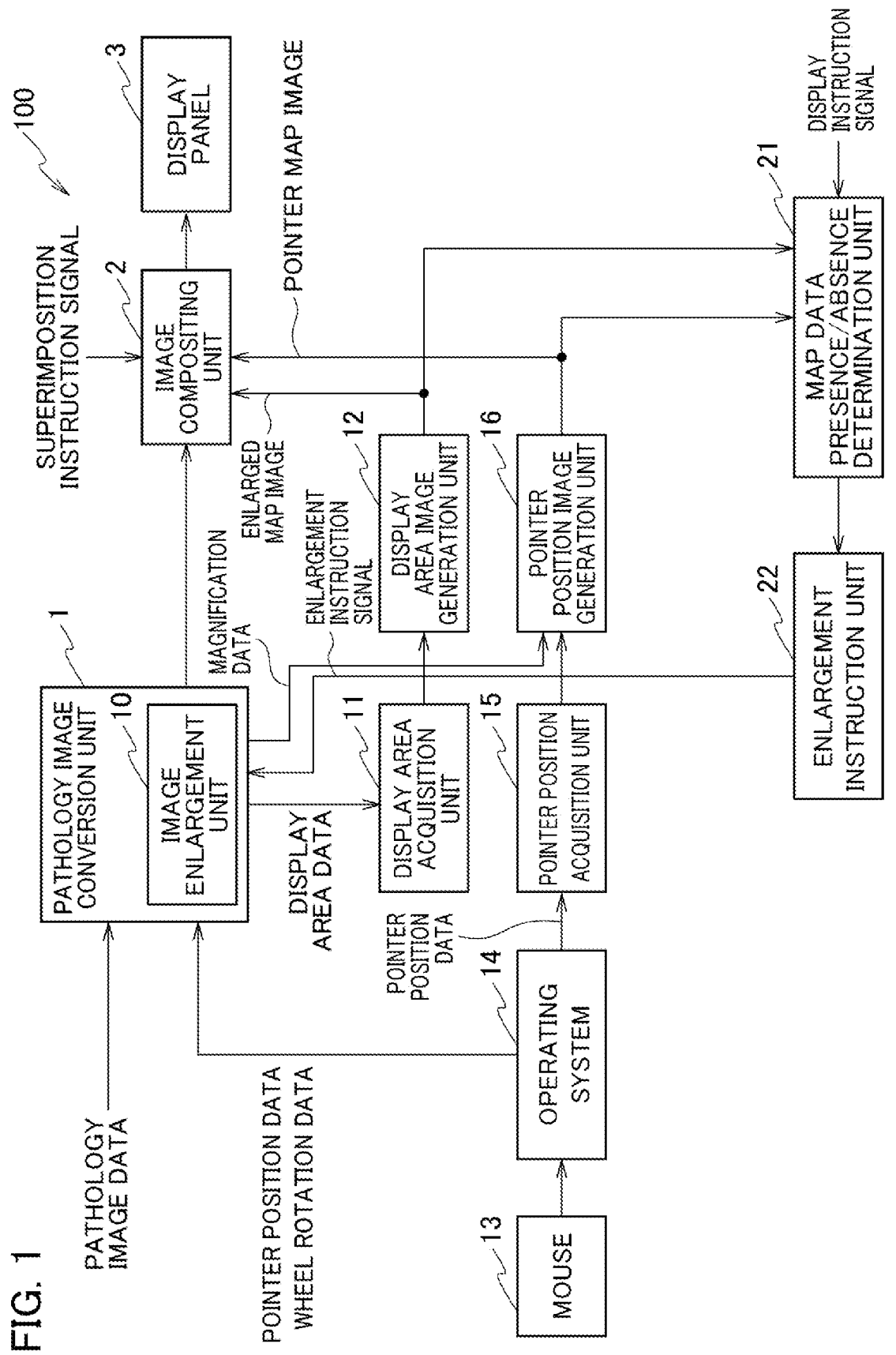
FIG. 1 is a block diagram illustrating a medical image display device according to a first embodiment.

In FIG. 1, a medical image display device 100 according to a first embodiment includes a pathology image conversion unit 1, an image compositing unit 2, a display panel 3, a display area acquisition unit 11, a display area image generation unit 12, an operating system 14, a pointer position acquisition unit 15, a pointer position image generation unit 16, a map data presence/absence determination unit 21, and an enlargement instruction unit 22. The pathology image conversion unit 1 includes an image enlargement unit 10. The display panel 3 is a liquid crystal panel, for example.

Generally, pieces of image data of various medical images are stored in a picture archiving and communication system (PACS) server. An unillustrated workstation reads the image data of the medical images from the PACS server and supplies the data to the medical image display device 100. In FIG. 1, the pathology image data read by the workstation from the PACS server is input to the pathology image conversion unit 1. It is needless to say that the way in which the pathology image data is input to the pathology image conversion unit 1 is not limited.

Figure 2:
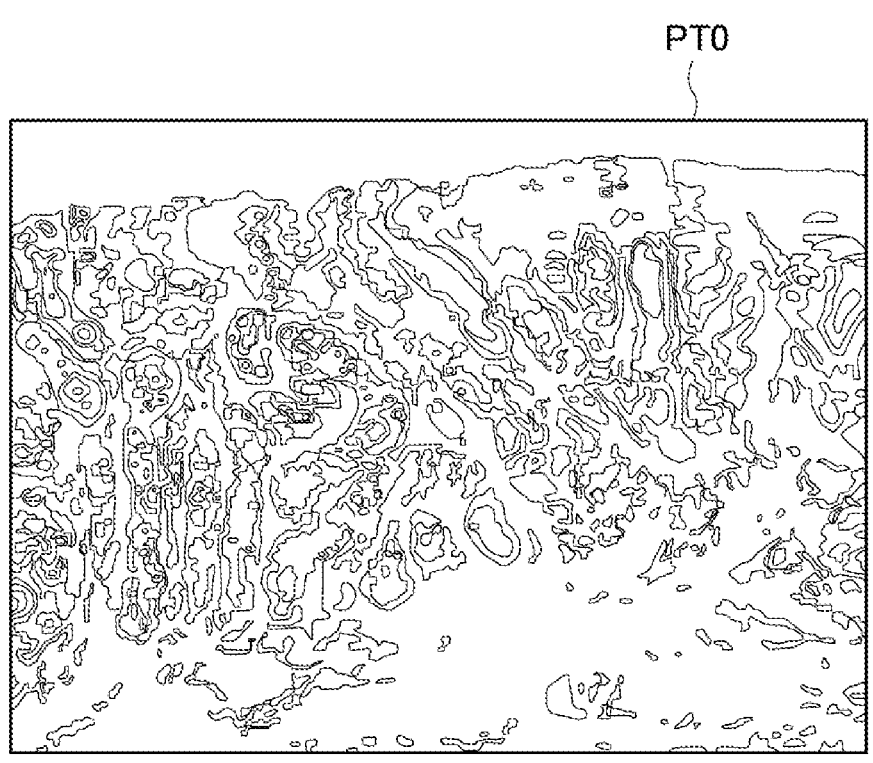
FIG. 2 is a diagram illustrating an example of a pathology image.

FIG. 2 shows an example of a pathology image based on the pathology image data input to the pathology image conversion unit 1. The pathology image shown in FIG. 2 is referred to as a pathology image PT0. The pathology image data is image data of a still image in which an image a pathology specimen placed on a slide is captured with a scanner and the image is converted to a digital image. Since the pathology specimen is stained with, for example, hematoxylin and eosin (HE staining), the pathology image PT0 shown in FIG. 2 shows a red-purple color due to HE staining. The pathology image data are binary data in accordance with JPEG or digital imaging and communications in medicine (DICOM) standards.

The pathology image conversion unit 1 converts the received pathology image data to a pathology image signal composed of three primary color signals of RGB, and supplies the signal to the image compositing unit 2. The image compositing unit 2 includes a drive circuit for displaying the pathology image signal of the three primary color signals on the display panel 3, and displays the pathology image signal on the display panel 3. While looking at the pathology image PT0 displayed on the display panel 3, a doctor determines whether a lesion is present while enlarging the pathology image PT0 as necessary by operating a mouse 13 connected to the operating system 14. The doctor is a determiner of the pathology image PT0. A researcher other than the doctor may be the determiner.

The operating system 14 supplies, to the pathology image conversion unit 1, pointer position data indicating a position of a pointer (what is referred to as a mouse pointer) which is moved by the doctor moving the mouse 13, and wheel rotation data in which a wheel is operated to enlarge the pathology image PT0 or reduce the enlarged pathology image PT0. The mouse 13 is an example of an operation unit that supplies, to the pathology image conversion unit 1, the pointer position data indicating the position of the pointer and enlargement instruction data for instructing partial enlargement of the pathology image PT0. If the doctor moves the mouse 13 to move the position of the pointer and rotates the wheel in the direction of image enlargement, the image enlargement unit 10 enlarges the pathology image PT0 displayed on the display panel 3 with the position of the pointer as the center.

Figure 3:
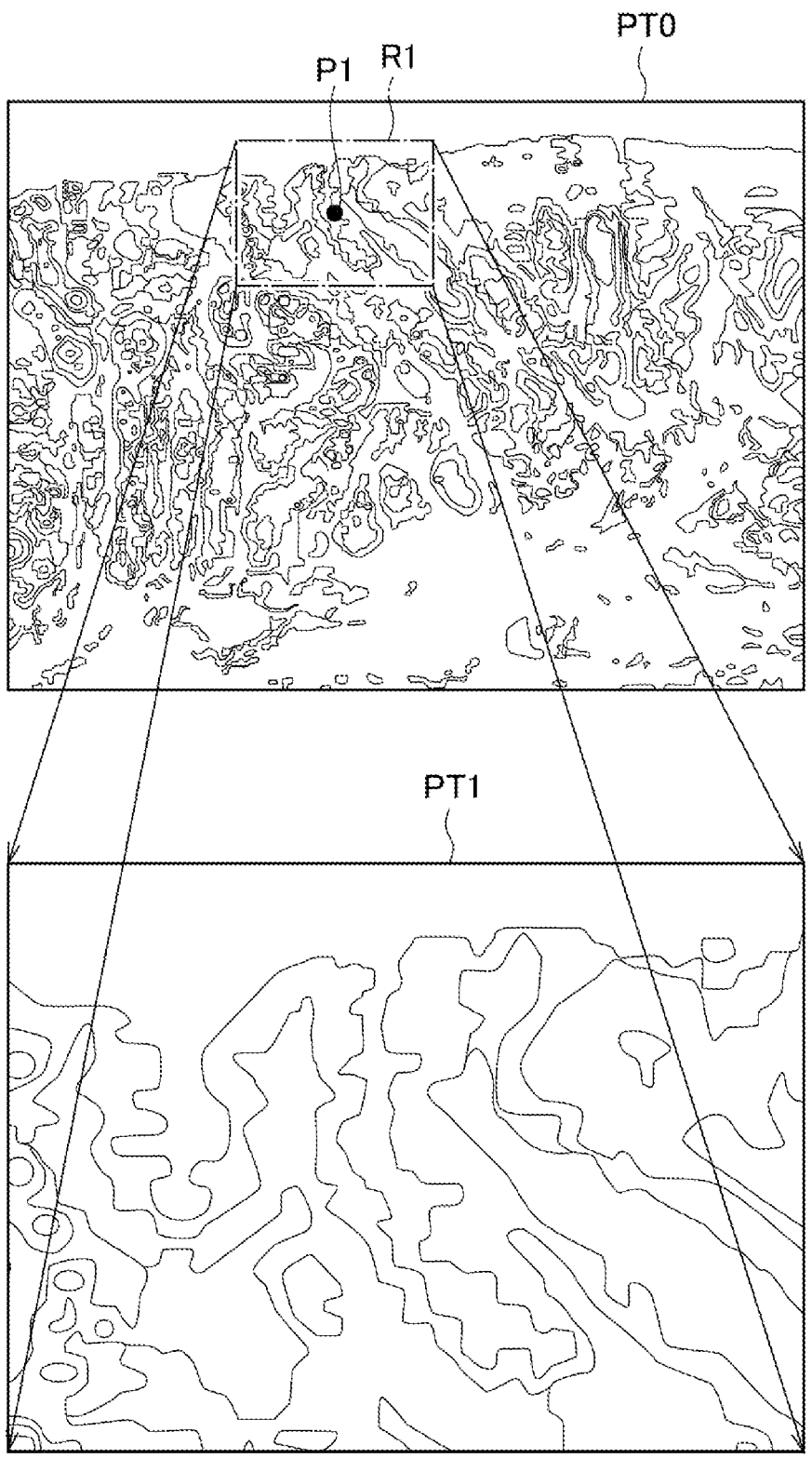
FIG. 3 is a diagram illustrating a state in which a partial area of the pathology image shown in FIG. 2 is enlarged.

When the image enlargement unit 10 enlarges a partial area of the pathology image PT0 based on the pointer position data and wheel rotation data supplied from the operating system 14, the enlarged area is displayed on the display panel 3. As shown in FIG. 3, when the pointer is at a position P1 and the doctor operates the wheel to enlarge the pathology image PT0, a partial area R1 indicated by a one-dot chain line is enlarged as a pathology image PT1 and displayed on the display panel 3, for example. At this time, the pathology image conversion unit 1 supplies, to the display area acquisition unit 11, display area data indicating the position of the enlarged area and the enlarged area.

The display area acquisition unit 11 acquires a display area showing a partial area of the pathology image PT0 displayed on the display panel 3 in an enlarged manner, based on the display area data. The display area acquisition unit 11 supplies display area information indicating the display area to the display area image generation unit 12. The display area information can be represented by pixel coordinates of four corners of a rectangular display area. The display area image generation unit 12 generates an enlarged map image based on the display area information acquired by means of the display area acquisition unit 11 and supplies the image to the image compositing unit 2. When the image compositing unit 2 receives an instruction signal for superimposing the enlarged map image on the pathology image PT0, the image compositing unit 2 superimposes the enlarged map image on the pathology image PT0 and supplies the image to the display panel 3.

The operating system 14 may generate a superimposition instruction signal in response to operations of the mouse 13 or other operation units and supply the signal to the image compositing unit 2.

Figure 4:
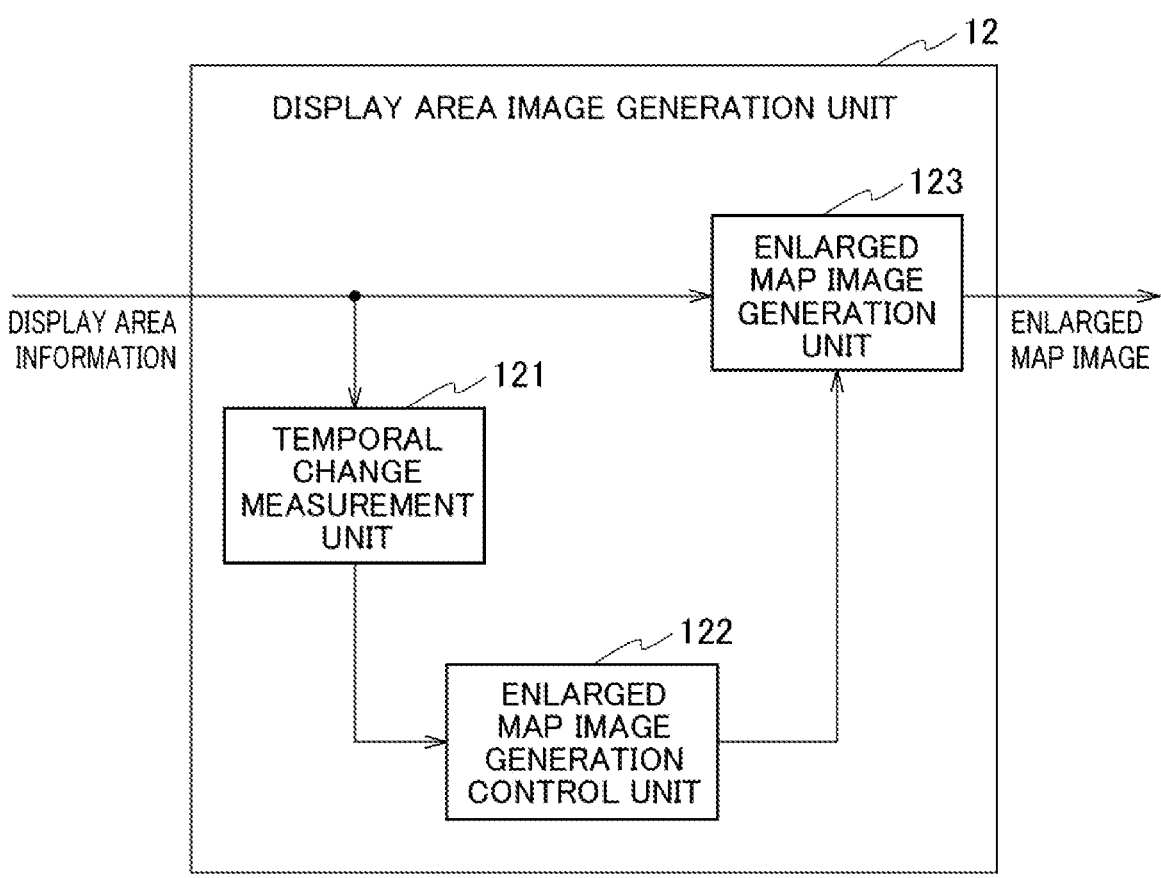
FIG. 4 is a block diagram illustrating a configuration example of a display area image generation unit 12 shown in FIG. 1.

FIG. 4 shows a specific configuration example of the display area image generation unit 12. The display area image generation unit 12 has a temporal change measurement unit 121, an enlarged map image generation control unit 122, and an enlarged map image generation unit 123. The temporal change measurement unit 121 measures a temporal change of the input display area data. Specifically, the temporal change measurement unit 121 supplies the value "1" to the enlarged map image generation control unit 122 if the input display area data does not change by a predetermined number of frames or more, and supplies the value "0" to the enlarged map image generation control unit 122 if the display area data changes by less than the predetermined number of frames.

Using FIG. 3 as an example, if the pathology image PT1 in which the area R1 is enlarged is displayed on the display panel 3 and the display area data does not change by the predetermined number of frames or more, it is highly likely that the doctor has visually confirmed the pathology image PT1. Even if a partial area is enlarged and displayed on the display panel 3, if the display area data changes by less than the predetermined number of frames, it is unlikely that the doctor has visually confirmed the enlarged pathology image PT1 displayed on the display panel 3. The enlarged map image generation control unit 122 controls the enlarged map image generation unit 123 so as to generate the enlarged map image showing the partial area of the pathology image PT0 indicated by the display area data when the value "1" is supplied from the temporal change measurement unit 121.

Figure 5:
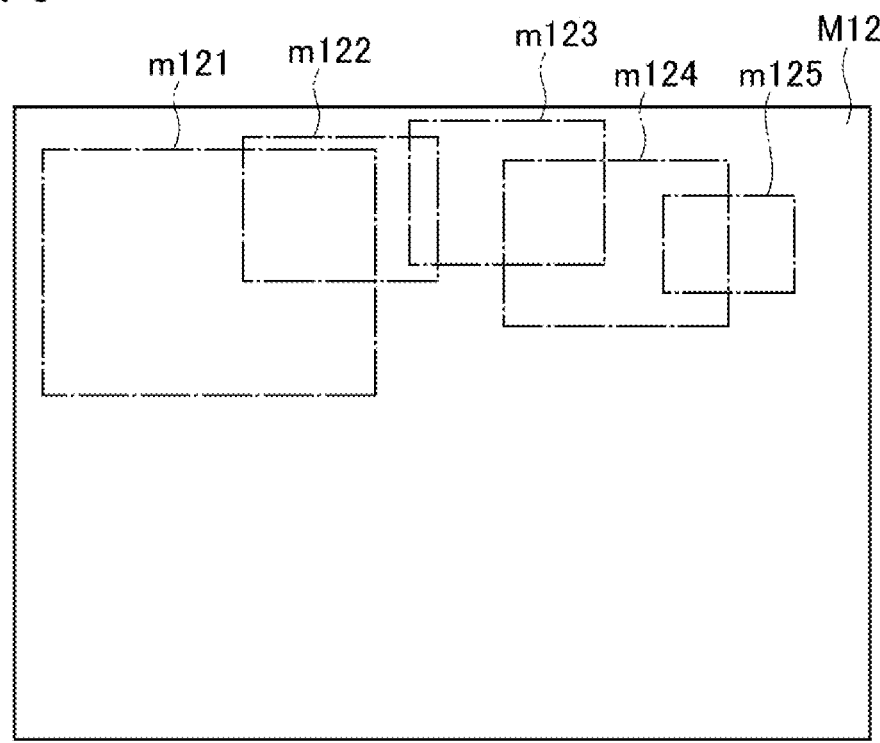
FIG. 5 is a diagram illustrating an example of an enlarged map image generated by a display area image generation unit 12 shown in FIG. 4.

FIG. 5 shows an example of an enlarged map image generated by the display area image generation unit 12. An enlarged map image M12 shown in FIG. 5 includes rectangular frames m121 to m125 which are partial areas in the pathology image PT0 and show the display areas displayed on the display panel 3 in an enlarged state by the predetermined number of frames or more. Among the rectangular frames m121 to m125, the rectangular frame m121 has the largest area and the rectangular frame m125 has the smallest area. The larger the area, the smaller the magnification percentage, and the smaller the area, the larger the magnification percentage.

Figure 6:
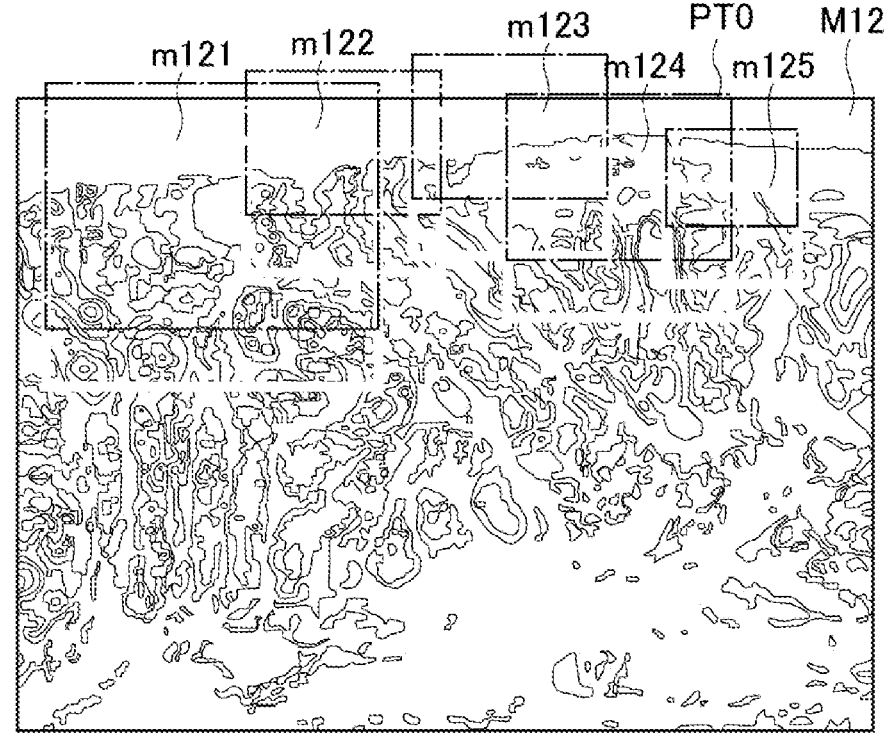
FIG. 6 is a diagram illustrating a state in which an enlarged map image is superimposed on a pathology image.

The display area image generation unit 12 may vary the colors of the rectangular frames m121 to m125 according to the magnification percentage in the display areas. The display area image generation unit 12 sets the display area as a red rectangular frame when the percentage is a predetermined magnification percentage or more, and alternatively sets the display area as a green rectangular frame when the percentage is less than the predetermined magnification percentage. FIG. 6 shows a state in which the enlarged map image M12 shown in FIG. 5 is superimposed on the pathology image PT0.

When the doctor determines whether a lesion is present by looking at the pathology image PT0, usually the doctor enlarges the area of concern and determines whether a lesion is present over a predetermined period of time. Therefore, among all the areas in the pathology image PT0, the area where the rectangular frames m121 to m125 are not superimposed is not enlarged, or even if the area is enlarged, the enlarged area is moved in a short time, and therefore it is highly likely that the doctor has not determined whether a lesion is present.

Returning to FIG. 1, the pointer position acquisition unit 15 acquires position information of a pointer in a frame based on the pointer position data. The pointer position image generation unit 16 generates a pointer map image based on the position information of the pointer acquired by means of the pointer position acquisition unit 15 and supplies the image to the image compositing unit 2. If the doctor positions the pointer on the pathology image PT0 by using the mouse or the like, it is highly likely that the doctor has visually recognized the image where the pointer is positioned. The pointer map image generated based on the position information of the pointer is also referred to as a viewing position map image. The pointer position image generation unit 16 is an example of a viewing position image generation unit.

It is preferable to supply, to the pointer position image generation unit 16, magnification data when the image enlargement unit 10 enlarges the partial area of the pathology image PT0. If the image compositing unit 2 receives an instruction signal for superimposing the pointer map image on the pathology image PT0, the image compositing unit 2 superimposes the pointer map image on the pathology image PT0 and supplies it to the display panel 3.

Figure 7:
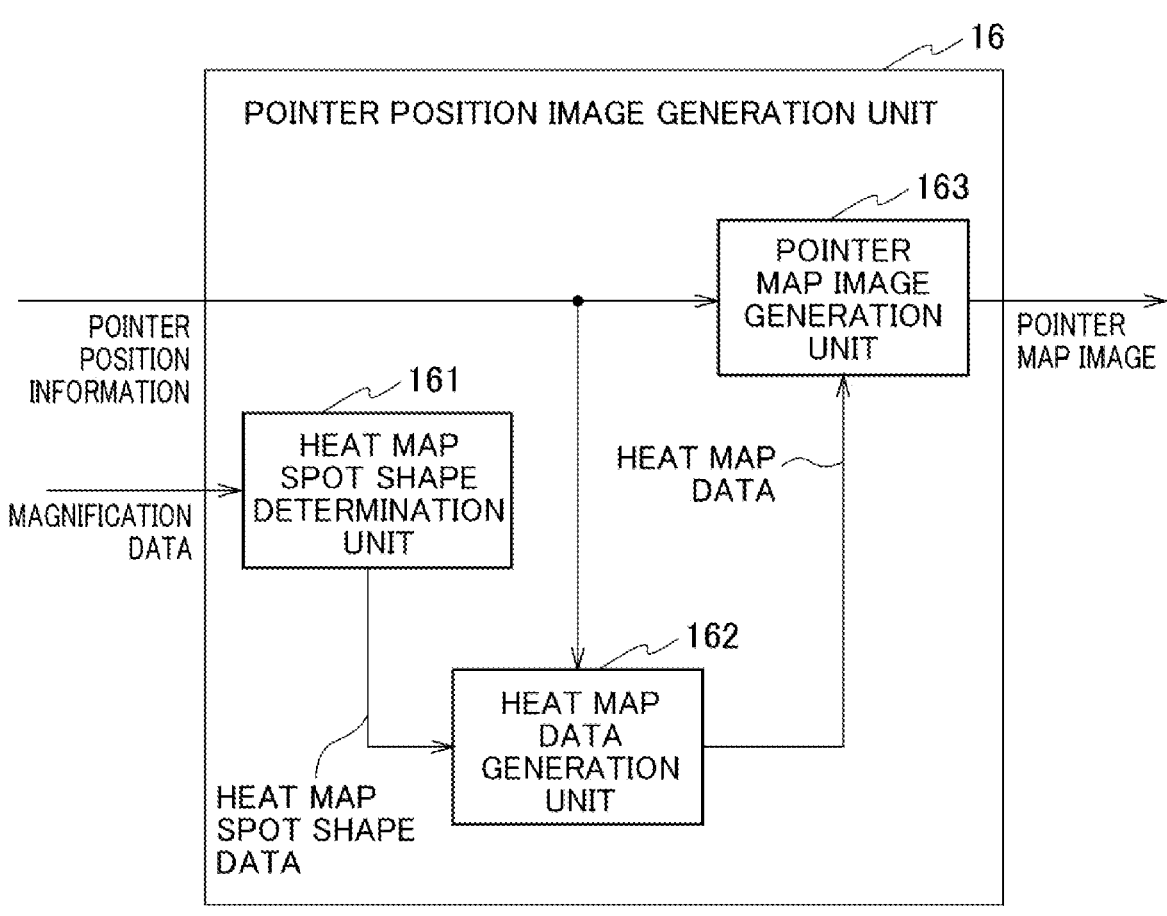
FIG. 7 is a block diagram illustrating a configuration example of a pointer position image generation unit 16 shown in FIG. 1.

FIG. 7 shows a configuration example of the pointer position image generation unit 16. The pointer position image generation unit 16 includes a heat map spot shape determination unit 161, a heat map data generation unit 162, and a pointer map image generation unit 163. The pointer position image generation unit 16 is not required to include the heat map spot shape determination unit 161 and heat map data generation unit 162, but it is preferable to include them. Assuming that the pointer position image generation unit 16 does not include the heat map spot shape determination unit 161 and heat map data generation unit 162, the operation of the pointer map image generation unit 163 will be described.

Figures 8, 9:
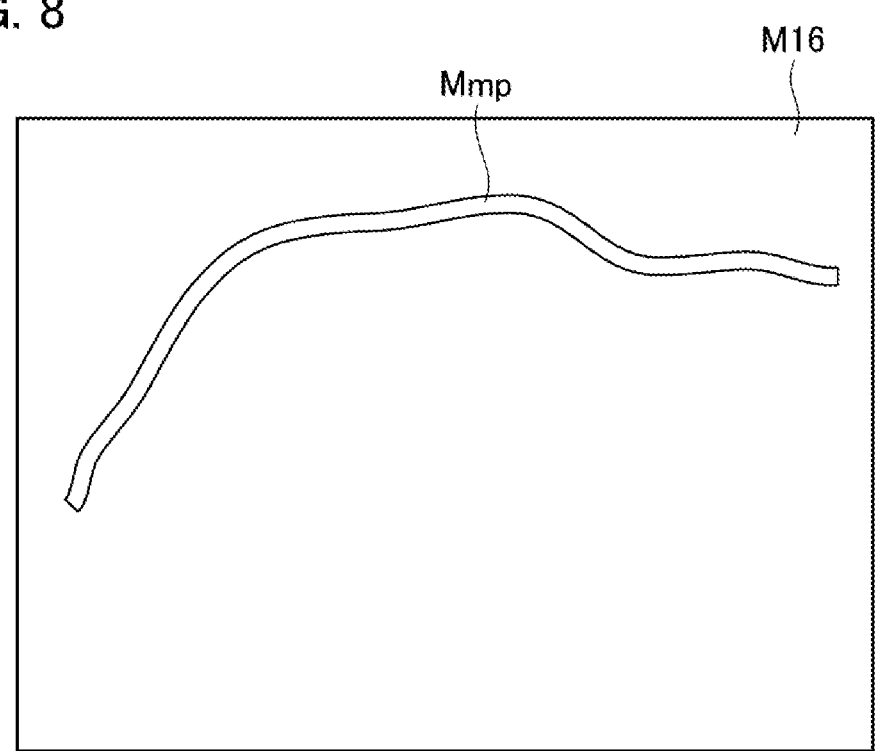
FIG. 8 is a diagram illustrating an example of a pointer map image generated by a pointer position image generation unit 16 shown in FIG. 7.
FIG. 9 is a diagram illustrating a state in which a pointer map image is superimposed on a pathology image.

The pointer map image generation unit 163 generates a pointer map image M16 indicating a movement trajectory Mmp of the pointer as shown in FIG. 8 based on the input pointer position information. FIG. 9 shows a state in which the pointer map image M16 shown in FIG. 8 is superimposed on the pathology image PT0.

Figure 10:
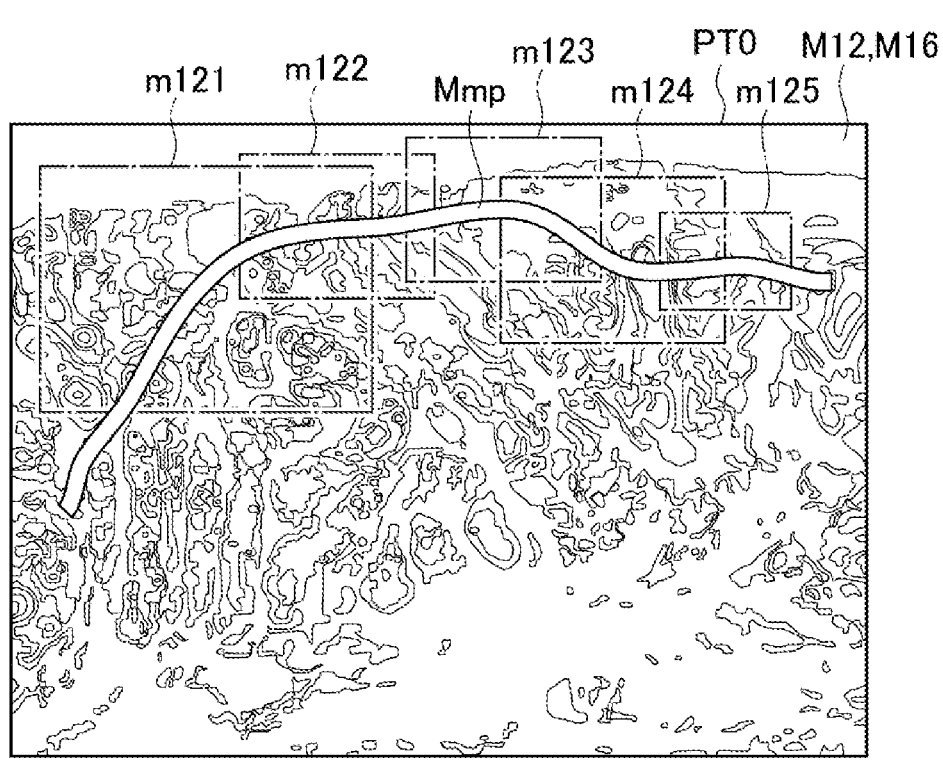
FIG. 10 is a diagram illustrating a state in which an enlarged map image and a pointer map image are superimposed on a pathology image.

An instruction signal for superimposing both the enlarged map image M12 and the pointer map image M16 on the pathology image PT0 may be input to the image compositing unit 2. After the image compositing unit 2 receives the instruction signal for superimposing the enlarged map image M12 and the pointer map image M16, as shown in FIG. 10, the image compositing unit 2 superimposes the enlarged map image M12 and the pointer map image M16 on the pathology image PT0 and supplies the images to the display panel 3.

A description will be given regarding the operations of the heat map spot shape determination unit 161 and the heat map data generation unit 162. The magnification data is input to the heat map spot shape determination unit 161. The heat map spot shape determination unit 161 generates heat map spot shape data z by using the Gaussian function $\varphi(x)$ of Formula (1). In Formula (1), variable a is a variable for determining the level of the Gaussian function $\varphi(x)$, and variable $\sigma$ is a variable for determining the steepness of the Gaussian function $\varphi(x)$.

$$\varphi(x) = a \exp\left(-\frac{x^2}{2\sigma^2}\right)$$

Figure 11:
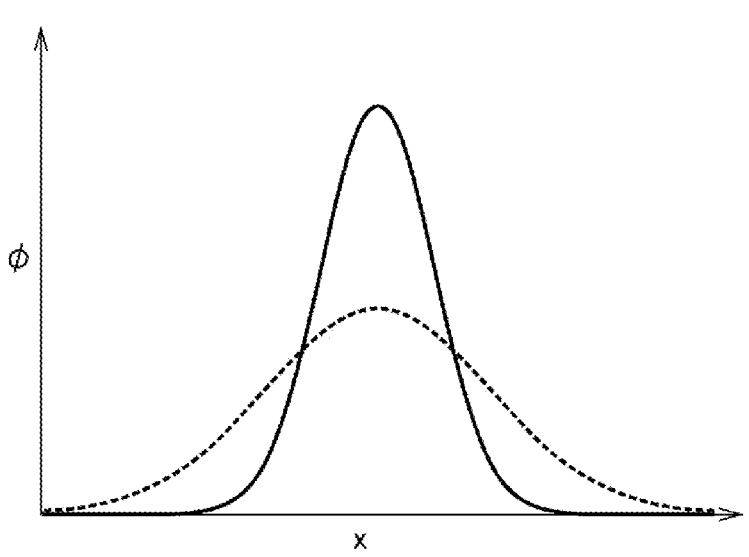
FIG. 11 is a characteristics diagram illustrating a spot shape of a heat map.

In Formula (1), if variable a is set to 1.0 and variable $\sigma$ is set to 1, the Gaussian function $\varphi(x)$ has a high level and steep characteristics as shown by the solid line in FIG. 11, for example. In Formula (1), if variable a is set to 0.5 and variable $\sigma$ is set to 2, the Gaussian function $\varphi(x)$ has a low level and gentle characteristics as shown by the dashed line in FIG. 11, for example. Although Formula (1) shows the two-dimensional shape shown in FIG. 11, the heat map spot shape in one or more embodiment is a shape shown in FIG. 12, which is extended three-dimensionally from the two-dimensional shape shown in FIG. 11. The heat map spot shape shown in FIG. 12 is expressed by Formula (2).

$$Z = a \cdot \exp(-(x^2 + y^2)/2\sigma^2) \tag{2}$$

The heat map spot shape determination unit 161 determines the spot shape of the heat map by determining the level and steepness of the Gaussian function $\varphi(x)$ by using variables a and $\sigma$ according to the magnification percentage indicated by the input magnification data. The heat map spot shape data generated by means of the heat map spot shape determination unit 161 indicates the characteristics of the Gaussian function $\varphi(x)$ shown in FIG. 11. The heat map data generation unit 162 generates heat map data having the shape shown in FIG. 12 based on the heat map spot shape data.

Figure 12:
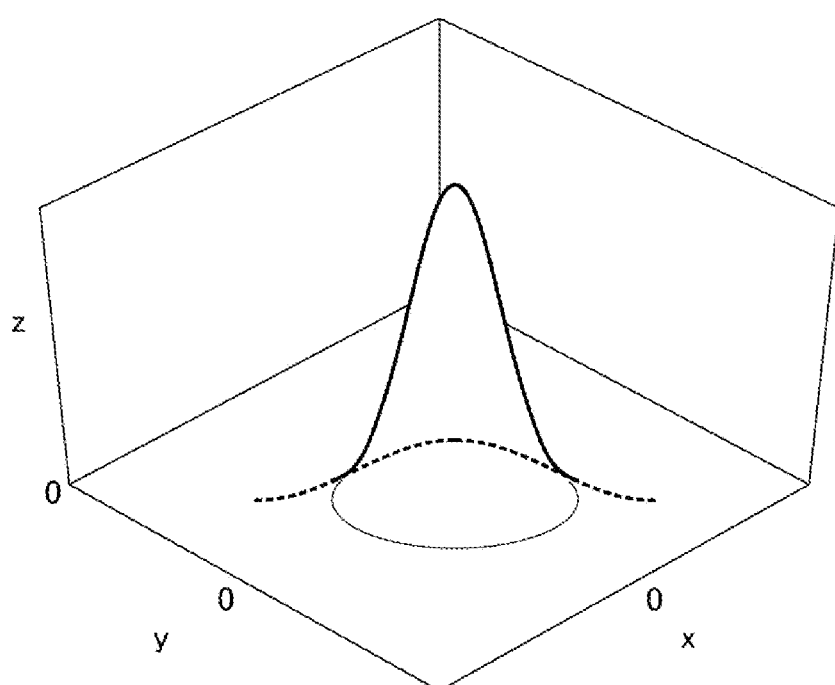
FIG. 12 is a characteristics diagram illustrating a spot shape of a heat map three dimensionally.

The heat map spot shape data shown in FIG. 12 is accumulated repeatedly at regular time intervals, and the heat map data is formed. If there is no change or the change is small in the input pointer position, the heat map spot shape data continues to be accumulated at roughly the same position, and this increases the level of the heat map data. Conversely, if there is a large change in the input pointer position, the heat map spot shape data is accumulated over a wide range while changing the position, and this decreases the level of the heat map data. Coloring is performed according to the level of the heat map data. A position near the top of the high-level and steep heat map data is colored in red, and as the level approaches zero, the position is colored in orange, yellow, and green in this order. As a result, the low level and gentle heat map data is colored in green, and a position near the top of the medium level heat map data is colored in orange or yellow depending on the level.

Figure 13:
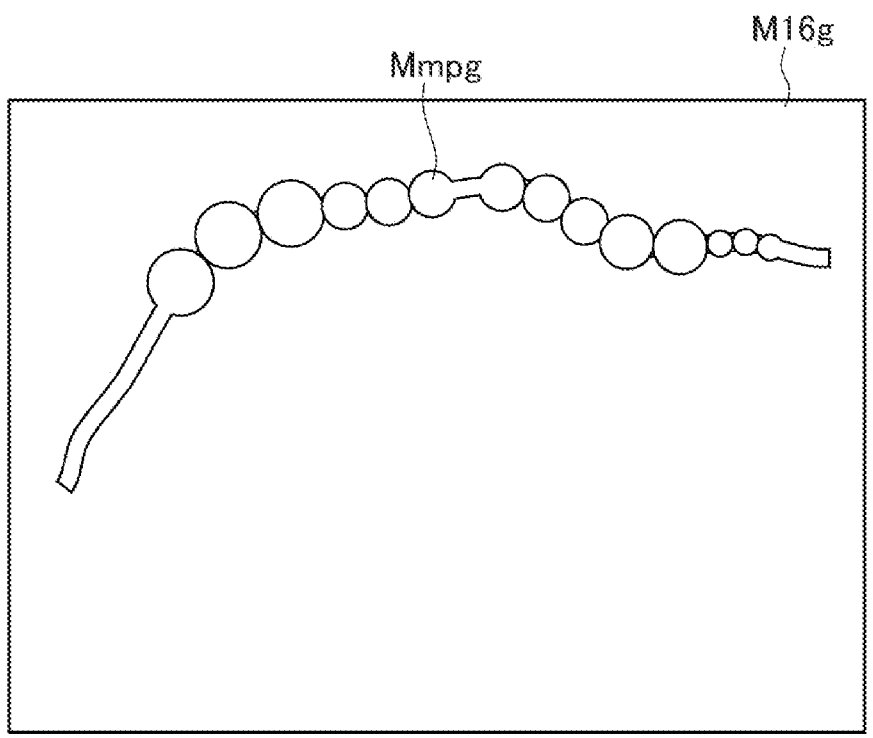
FIG. 13 is a diagram illustrating a pointer map image drawn using heat map data.

The pointer map image generation unit 163 generates a pointer map image M16g showing a movement trajectory Mmpg of a pointer as shown in FIG. 13, based on the input pointer position information and heat map data. The pointer map image generation unit 163 draws the movement trajectory Mmpg in a two-dimensional shape in which the heat map data shown in FIG. 12 is viewed from above. Accordingly, a circle having a size corresponding to the shape of the heat map data is drawn in the movement trajectory Mmpg. The pointer map image generation unit 163 draws the movement trajectory Mmpg in a circle that becomes larger as the shape of the heat map data becomes lower and gentler, and in a circle that becomes smaller as the shape of the heat map data becomes higher and steeper.

Since each color is set in the heat map data as described above, the center of a small circle is shown in red, and the portion around the center is surrounded by orange, yellow, and green in this order. A large circle is shown in green and the center of a medium circle is shown in orange or yellow.

As shown in FIG. 13, a plurality of circles of different sizes are drawn in the movement trajectory Mmpg. It is not essential that the colors used to display the circles differ depending on the sizes of the circles, but it is preferable that the colors differ.

According to the pointer map image M16g showing the movement trajectory Mmpg shown in FIG. 13, it is possible to recognize the magnification percentage when the partial area of the pathology image PT0 is enlarged. Therefore, it is preferable to use the pointer map image M16g showing the movement trajectory Mmpg shown in FIG. 13 rather than the pointer map image M16 showing the movement trajectory Mmp shown in FIG. 8. The portion that is displayed in the non-enlarged area of the pathology image PT0, in the movement trajectory Mmpg of the pointer map image M16g, may be a line of a predetermined fixed width.

According to the medical image display device 100, by superimposing the enlarged map image M12 and the pointer map image M16 (M16g) on the pathology image PT0, it is possible to easily confirm which area out of all the areas in the pathology image PT0 the doctor is looking at and which areas the doctor is not looking at. This can reduce the possibility of missing a lesion.

After a display instruction signal is input to the map data presence/absence determination unit 21, the map data presence/absence determination unit 21 performs the following processing. The operating system 14 may generate the display instruction signal in response to the operation by using the mouse 13 or other operation units and supply the signal to the map data presence/absence determination unit 21.

Figures 20, 21:
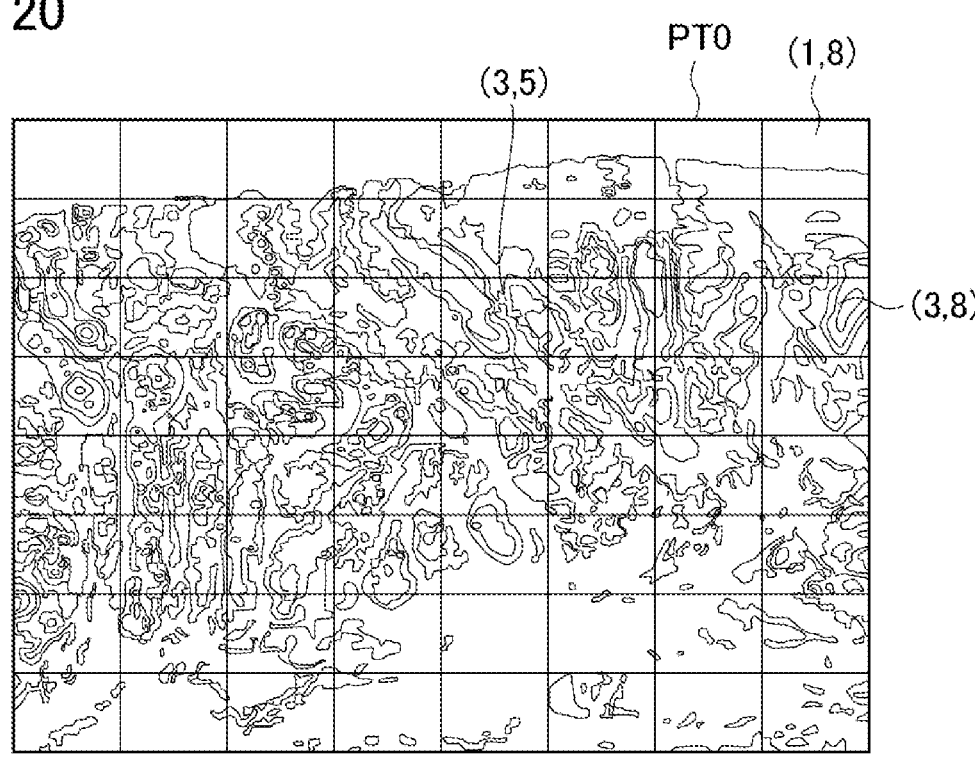
FIG. 20 is a diagram illustrating a state in which a frame of a pathology image is divided into a plurality of unit areas.
FIG. 21 is a diagram illustrating a determination map in which whether map data is present for each unit area has been determined.

As shown in FIG. 20, the map data presence/absence determination unit 21 divides the frame of the pathology image PT0 into a plurality of unit areas and determines whether the enlarged map image M12 and the pointer map image M16 (M16g) are present for each unit area. Although FIG. 20 shows the pathology image PT0 to facilitate understanding, the pathology image data of the pathology image PT0 is not input to the map data presence/absence determination unit 21. In practice, the unit area is a smaller area than the size shown in FIG. 20.

The map data presence/absence determination unit 21 determines whether map data of each map image is present for each unit area and generates a determination map M21 as shown in FIG. 21. A value of 1 in the determination map M21 indicates that pieces of map data of both the enlarged map image M12 and the pointer map image M16 (M16g) are present, and a value of 0 indicates that map data of either one of the images above is not present. No map data is present in the unit area at the positions indicated by (1, 8), (3, 5), and (3, 8) for example.

After the map data presence/absence determination unit 21 completes the determination as to whether the map data is present for each unit area in the frame of the pathology image PT0, the map data presence/absence determination unit 21 supplies, to the enlargement instruction unit 22, position information of unit areas in which map data of either one of the images is not present. The enlargement instruction unit 22 supplies an enlargement instruction signal to the image enlargement unit 10 and instructs the image enlargement unit 10 to sequentially enlarge the unit areas at the positions of the received position information.

When the doctor confirms the pathology image PT0 in detail, the doctor often enlarges the image and then confirms the image. Therefore, it is highly possible that an area where pieces of map data of both the enlarged map image M12 and pointer map image M16 (M16g) are present is an area that has been confirmed in detail, and other areas are areas that have not been confirmed in detail. Therefore, by sequentially enlarging and displaying the areas where map data of either one of the enlarged map image M12 and pointer map image M16 (M16g) is not present, it is possible to prompt the doctor to reconfirm overlooked parts.

Figure 22:
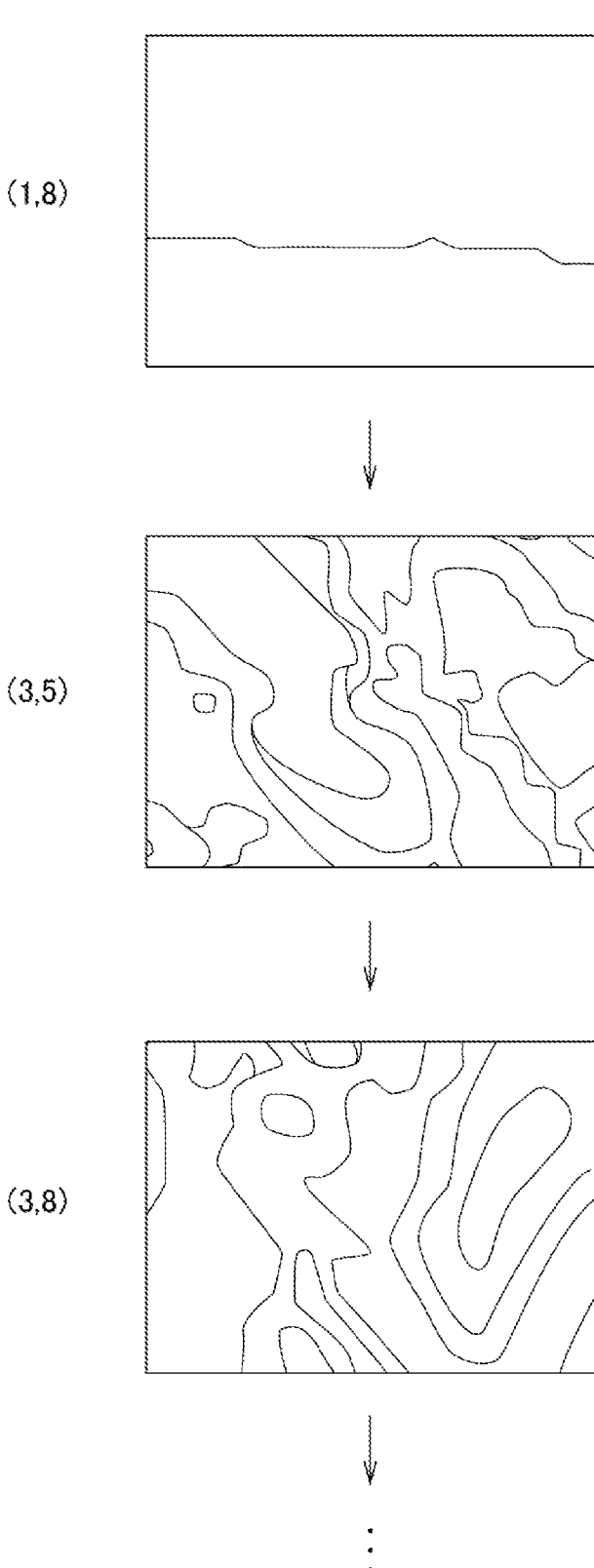
FIG. 22 is a diagram illustrating processing performed by an image enlargement unit 10 shown in FIG. 19 to sequentially enlarge an image of a unit area in which no map data is present and supply it to a display panel 3.

As shown in FIG. 22, after receiving the instruction from the enlargement instruction unit 22, the image enlargement unit 10 sequentially enlarges the images of the unit areas at the positions indicated by (1, 8), (3, 5), (3, 8), and so forth, where the value is set to 0 in the pathology image PT0. The enlarged images of the unit areas are supplied to the display panel 3 via the image compositing unit 2 and are sequentially displayed on the panel. The doctor can reassess whether a lesion is present by looking at the enlarged images displayed on the display panel 3. The time for displaying one enlarged image can be set to a predetermined time during which the doctor can determine whether a lesion is present. If necessary, the enlargement instruction unit 22 may stop updating the enlarged image due to the mouse 13 or the like being operated.

The map data presence/absence determination unit 21 may determine whether the map data of the enlarged map image M12 is present for each unit area and generate the determination map M21 as shown in FIG. 21. The map data presence/absence determination unit 21 may determine whether the map data of the pointer map image M16 (M16g) is present for each unit area and generate the determination map M21 as shown in FIG. 21.

The map data presence/absence determination unit 21 may determine whether the map data of at least one of the enlarged map image M12 and the pointer map image M16 (M16g) is present for each unit area and generate the determination map M21 as shown in FIG. 21.

Second Embodiment

Figure 19:
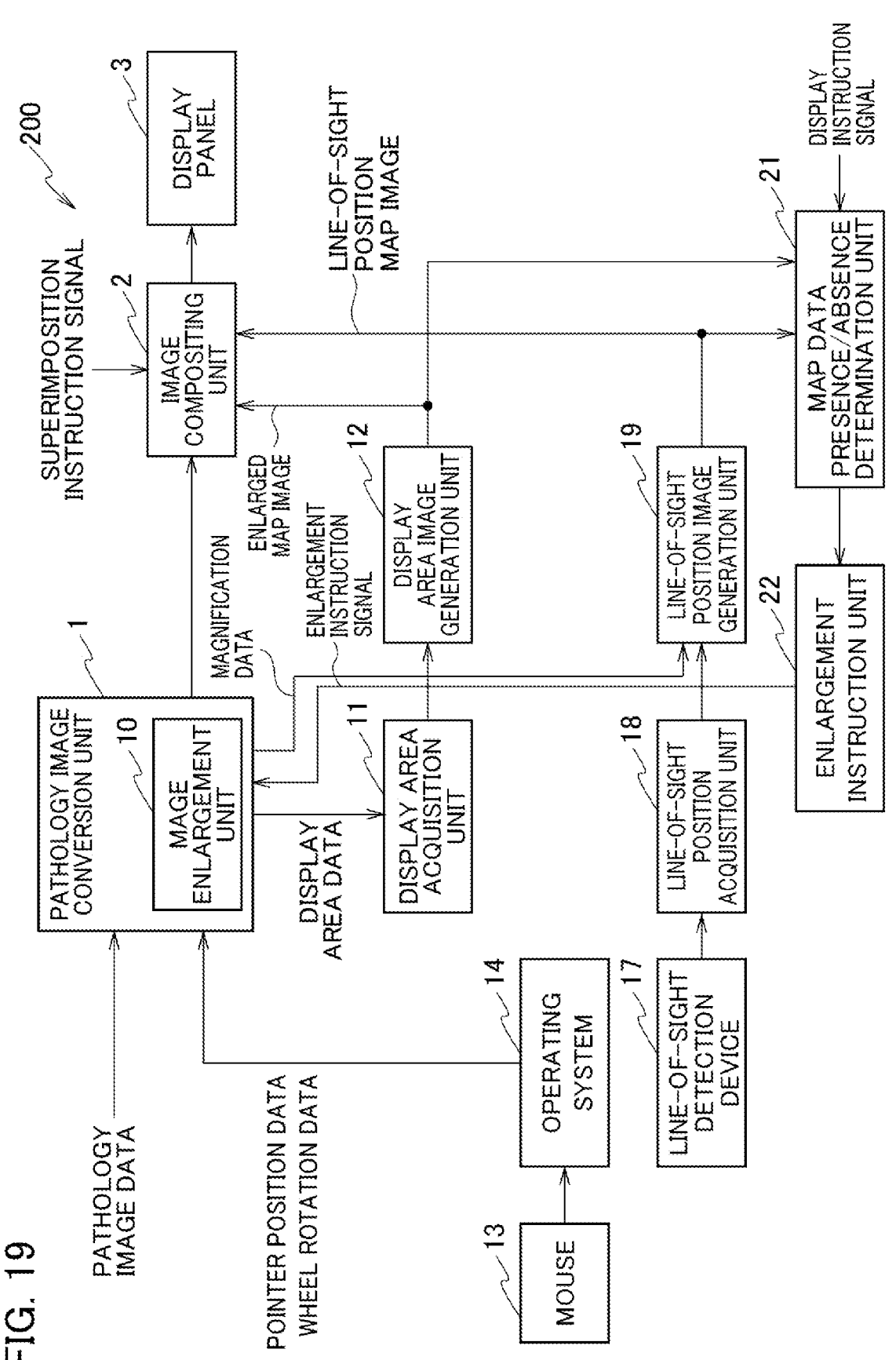
FIG. 19 is a block diagram illustrating a medical image display device according to a second embodiment.

FIG. 19 shows a medical image display device 200 according to a second embodiment. In FIG. 19, the same parts as those in FIG. 1 are denoted with the same reference numerals, and descriptions thereof may be omitted. The medical image display device 200 includes a line-of-sight detection device 17, a line-of-sight position acquisition unit 18, and a line-of-sight position image generation unit 19 instead of the pointer position acquisition unit 15 and the pointer position image generation unit 16 of the medical image display device 100.

In FIG. 19, the line-of-sight detection device 17 detects the line-of-sight of the doctor looking at the pathology image PT0 displayed on the display panel 3. The line-of-sight detection device 17 can be composed of a pair of left and right light-emitting diodes that irradiate the left and right eyes of the doctor with near-infrared light at a wavelength of 850 nm, and a pair of left and right cameras that capture images of the left and right eyes, for example. In detail, the configuration disclosed in Japanese Unexamined Patent Application Publication No. 2017-102687 can be used as the line-of-sight detection device 17.

The line-of-sight position acquisition unit 18 acquires the position information of the line-of-sight of the doctor looking at the pathology image PT0 displayed on the display panel 3, detected by means of the line-of-sight detection device 17. The line-of-sight position image generation unit 19 generates a line-of-sight position map image based on the line-of-sight position acquired by means of the line-of-sight position acquisition unit 18 and supplies the image to the image compositing unit 2. By generating a line-of-sight position map based on the doctor's line-of-sight position, the medical image display device 200 can more accurately detect which parts of the pathology image PT0 have been looked at by the doctor. The line-of-sight position map image is also referred to as a viewing position map image. The line-of-sight position image generation unit 19 is another example of the viewing position image generation unit.

It is preferable to supply, to the line-of-sight position image generation unit 19, the magnification data when the image enlargement unit 10 enlarges the partial area of the pathology image PT0. After receiving an instruction signal for superimposing the line-of-sight position map image on the pathology image PT0, the image compositing unit 2 superimposes the line-of-sight position map image on the pathology image PT0 and supplies the image to the display panel 3.

Figure 14:
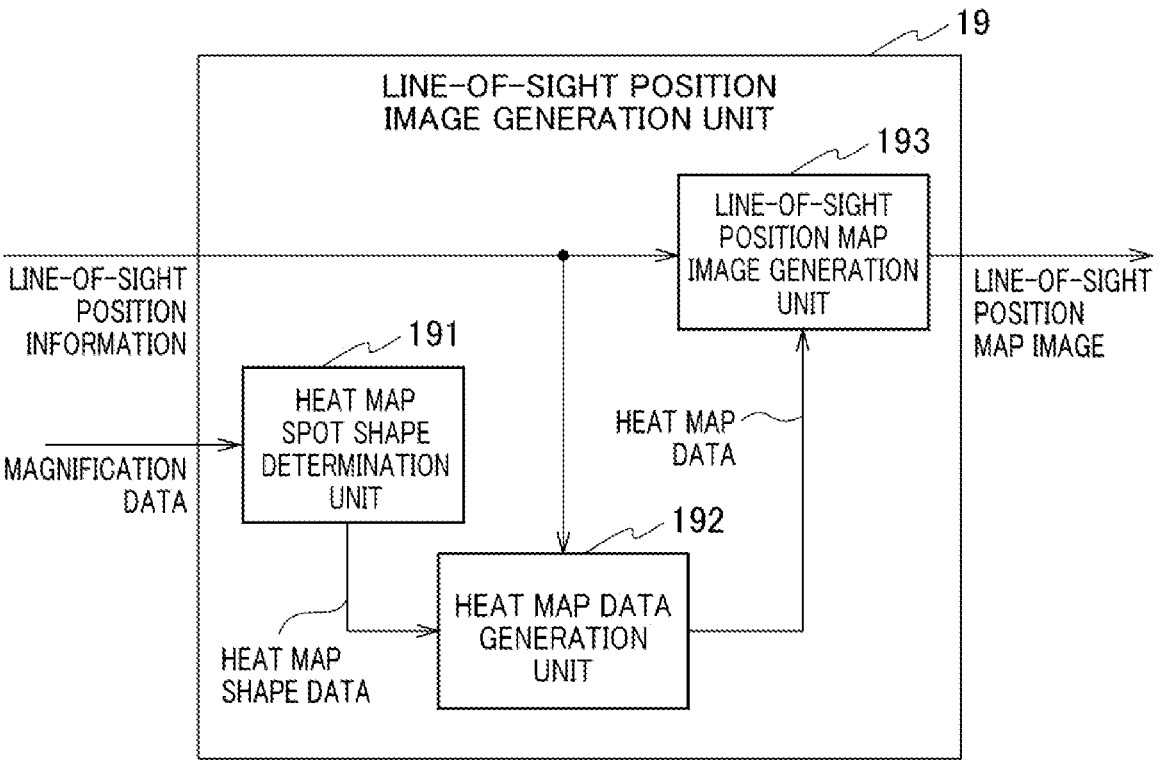
FIG. 14 is a block diagram illustrating a configuration example of a line-of-sight position image generation unit 19 shown in FIG. 1.

FIG. 14 shows a specific configuration example of the line-of-sight position image generation unit 19. The line-of-sight position image generation unit 19 includes a heat map spot shape determination unit 191, a heat map data generation unit 192, and a line-of-sight position map image generation unit 193. Although it is not essential that the line-of-sight position image generation unit 19 includes the heat map spot shape determination unit 191 and the heat map data generation unit 192, it is preferable that the line-of-sight position image generation unit 19 includes the above units. Assuming that the line-of-sight position image generation unit 19 does not include the heat map spot shape determination unit 191 and the heat map data generation unit 192, the operation of the line-of-sight position map image generation unit 193 will be described.

Figure 15:
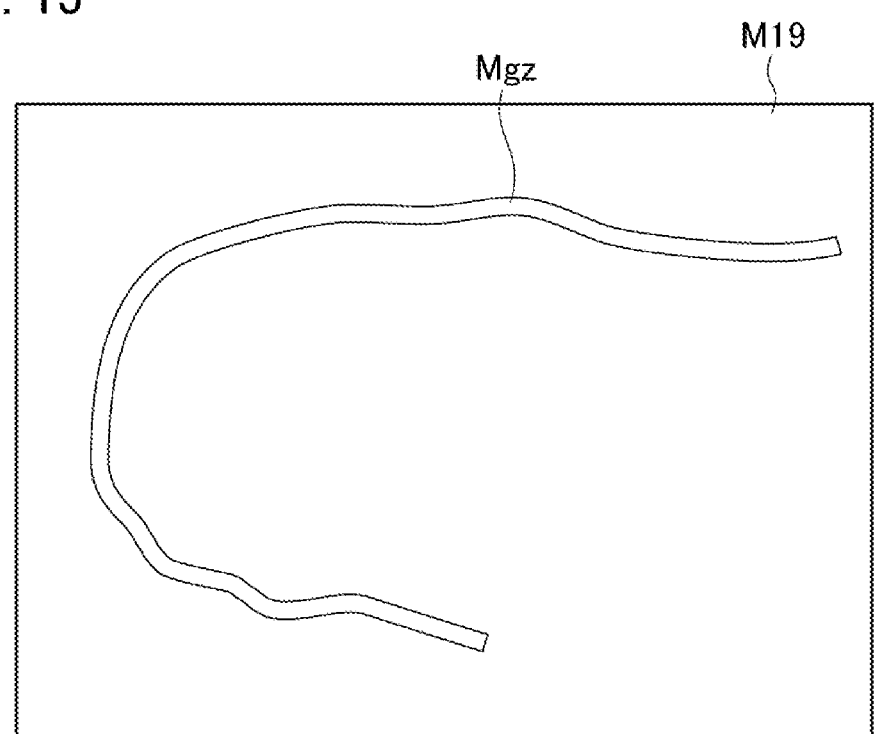
FIG. 15 is a diagram illustrating an example of a line-of-sight position map image generated by a line-of-sight position image generation unit 19 shown in FIG. 14.
Figure 16:
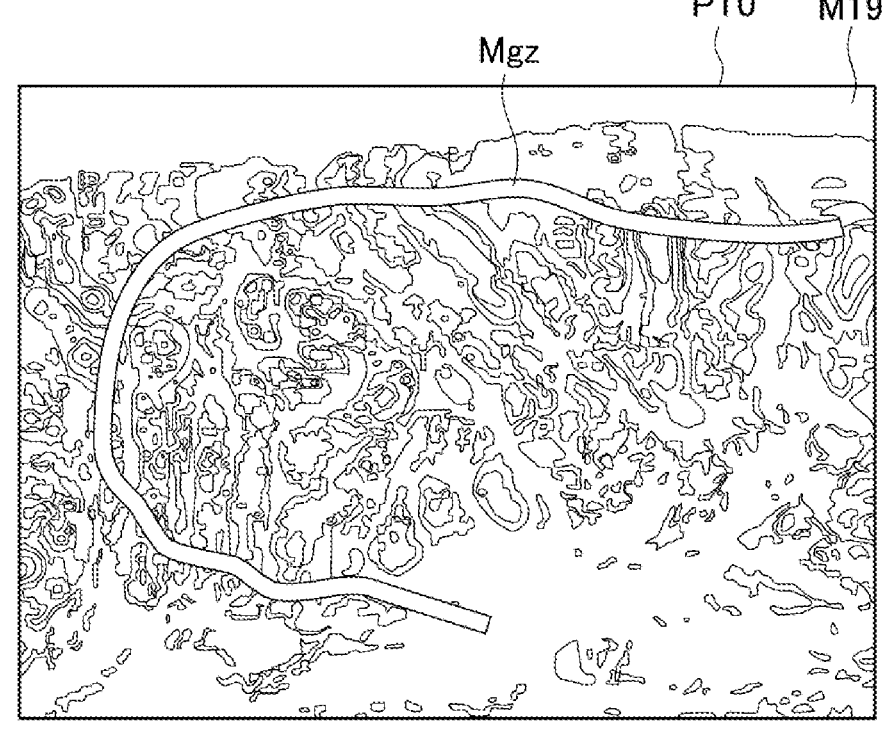
FIG. 16 is a diagram illustrating a state in which a line-of-sight position map image is superimposed on a pathology image.

The line-of-sight position map image generation unit 193 generates a line-of-sight position map image M19 showing a movement trajectory Mgz of the line-of-sight position as shown in FIG. 15 based on the input line-of-sight position information. FIG. 16 shows a state in which the line-of-sight position map image M19 shown in FIG. 15 is superimposed on the pathology image PT0.

Figure 17:
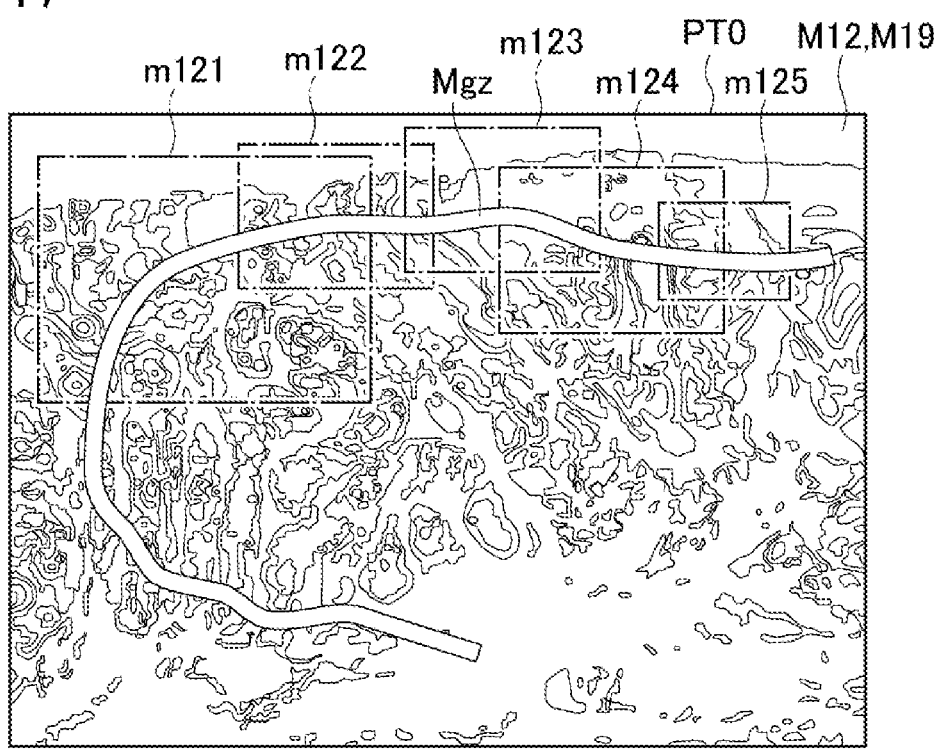
FIG. 17 is a diagram illustrating a state in which an enlarged map image and a line-of-sight position map image are superimposed on a pathology image.

The instruction signal for superimposing both the enlarged map image M12 and the line-of-sight position map image M19 on the pathology image PT0 may be input to the image compositing unit 2. After receiving the instruction signal for superimposing the enlarged map image M12 and the line-of-sight position map image M19, as shown in FIG. 17, the image compositing unit 2 superimposes the enlarged map image M12 and the line-of-sight position map image M19 on the pathology image PT0 and supplies the image to the display panel 3.

After receiving the instruction signal for superimposing the enlarged map image M12 and the line-of-sight position map image M19, the image compositing unit 2 superimposes the enlarged map image M12 and the line-of-sight position map image M19 on the pathology image PT0 and supplies the images to the display panel 3.

The heat map spot shape determination unit 191 generates heat map spot shape data similar to the heat map spot shape determination unit 161 shown in FIG. 7. Similar to the heat map data generation unit 162 shown in FIG. 7, the heat map data generation unit 192 generates heat map data and supplies the data to the line-of-sight position map image generation unit 193.

Figure 18:
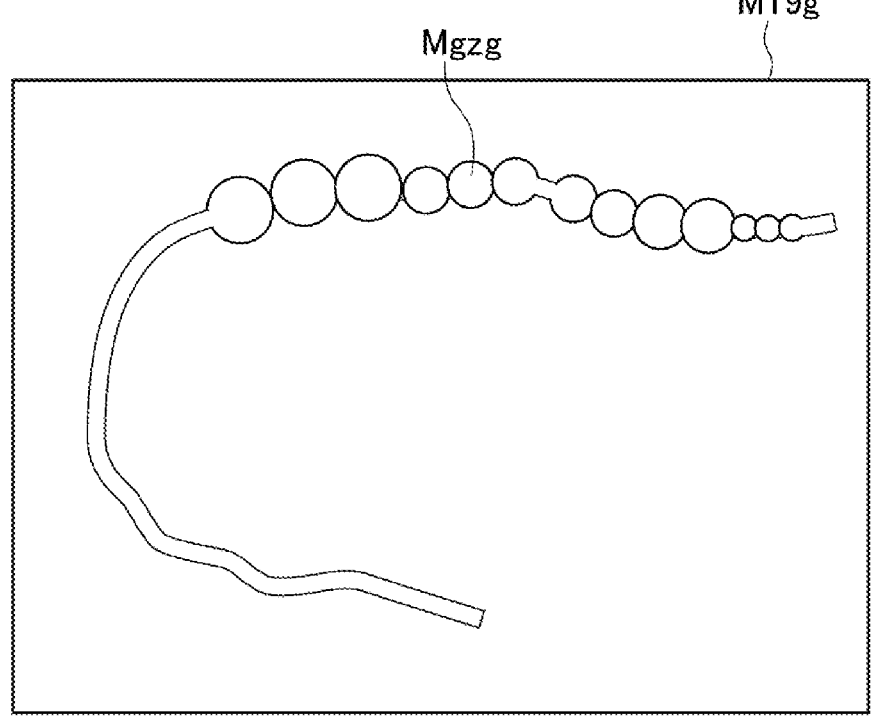
FIG. 18 is a diagram illustrating a line-of-sight position map image drawn using heat map data.

The line-of-sight position map image generation unit 193 generates a line-of-sight position map image M19g showing the movement trajectory Mgzg of the line-of-sight position as shown in FIG. 18, based on the input line-of-sight position information and heat map data. Similar to the pointer map image generation unit 163, the line-of-sight position map image generation unit 193 draws the movement trajectory Mgzg with a circle having a size that corresponds to the shape indicated by the heat map data. As shown in FIG. 18, a plurality of circles with different sizes are drawn in the movement trajectory Mgzg. Similar to the pointer map image generation unit 163, it is not essential that the colors used to display the circles differ depending on the sizes of the circles, but it is preferable that the colors differ.

According to the line-of-sight position map image M19g showing the movement trajectory Mgzg shown in FIG. 18, it is possible to recognize the magnification percentage when the partial area of the pathology image PT0 is enlarged. Therefore, it is preferable to use the line-of-sight position map image M19g showing the movement trajectory Mgzg shown in FIG. 18 rather than the line-of-sight position map image M19 showing the movement trajectory Mgz shown in FIG. 15. The portion that is displayed in the non-enlarged area of the pathology image PT0, in the movement trajectory Mgzg of the line-of-sight position map image M19g, may be a line of a predetermined fixed width.

As described above, the medical image display device 200 according to a second embodiment superimposes the enlarged map image M12 and the line-of-sight position map image M19 on the pathology image PT0. It is preferable that the medical image display device 200 superimposes the line-of-sight position map image M19g on the pathology image PT0 instead of the line-of-sight position map image M19.

According to the medical image display device 200, by superimposing the enlarged map image M12 and the line-of-sight position map image M19 (M19g) on the pathology image PT0, it is possible to easily confirm which area out of all the areas in the pathology image PT0 the doctor is looking at and which areas the doctor is not looking at. This can reduce the possibility of missing a lesion.

After a display instruction signal is input to the map data presence/absence determination unit 21, the map data presence/absence determination unit 21 performs the following processing. The operating system 14 may generate a display instruction signal in response to the operation using the mouse 13 or other operation units and supply the signal to the map data presence/absence determination unit 21.

As shown in FIG. 20, the map data presence/absence determination unit 21 divides the frame of the pathology image PT0 into a plurality of unit areas and determines whether the enlarged map image M12 and the line-of-sight position map image M19 (M19g) are present for each unit area. Although FIG. 20 shows the pathology image PT0 to facilitate understanding, the pathology image data of the pathology image PT0 is not input to the map data presence/absence determination unit 21. In practice, the unit area is a smaller area than the size shown in FIG. 20.

The map data presence/absence determination unit 21 determines whether map data of each map image is present for each unit area and generates the determination map M21 as shown in FIG. 21. A value of 1 in the determination map M21 indicates that pieces of map data of both the enlarged map image M12 and the line-of-sight position map image M19 (M19g) are present, and a value of 0 indicates that map data of either one of the images above is not present. No map data is present in the unit areas at the positions indicated by (1, 8), (3, 5), and (3, 8) for example.

After the map data presence/absence determination unit 21 completes the determination as to whether the map data is present for each unit area in the frame of the pathology image PT0, the map data presence/absence determination unit 21 supplies, to the enlargement instruction unit 22, position information of a unit area in which map data of either one of the images is not present. The enlargement instruction unit 22 supplies an enlargement instruction signal to the image enlargement unit 10 and instructs the image enlargement unit 10 to sequentially enlarge the unit areas at the positions of the received position information.

When the doctor confirms the pathology image PT0 in detail, the doctor often enlarges the image and then confirms the image. Therefore, it is highly possible that an area where the pieces of map data of both the enlarged map image M12 and the line-of-sight position map image M19 (M19g) are present is an area that has been confirmed in detail, and other areas are areas that have not been confirmed in detail. Therefore, it is possible to prompt the doctor to reconfirm overlooked parts by sequentially enlarging and displaying the areas where the map data of either one of the enlarged map image M12 and the line-of-sight position map image M19 (M19g) is not present.

As shown in FIG. 22, after receiving the instruction from the enlargement instruction unit 22, the image enlargement unit 10 sequentially enlarges the images of the unit areas at the positions indicated by (1, 8), (3, 5), (3, 8), and so forth, where the value is set to 0 in the pathology image PT0. The enlarged images of the unit areas are supplied to the display panel 3 via the image compositing unit 2 and are sequentially displayed on the panel. The doctor can reassess whether a lesion is present by looking at the enlarged images displayed on the display panel 3. The time for displaying one enlarged image can be set to a predetermined time during which the doctor can determine whether a lesion is present. If necessary, the enlargement instruction unit 22 may stop updating the enlarged image due to the mouse 13 or the like being operated.

The map data presence/absence determination unit 21 may determine whether the map data of the enlarged map image M12 is present for each unit area and generate the determination map M21 as shown in FIG. 21. The map data presence/absence determination unit 21 may determine whether the map data of the line-of-sight position map image M19 (M19g) is present for each unit area and generate the determination map M21 as shown in FIG. 21.

The map data presence/absence determination unit 21 may determine whether the map data of at least one of the enlarged map image M12 and line-of-sight position map image M19 (M19g) is present for each unit area and generate the determination map M21 as shown in FIG. 21.

The present invention is not limited to first and second embodiments described above, and various modifications are possible without deviating from the gist of the present invention. A configuration may be adopted which is a combination of the configuration of a first embodiment and the configuration of a second embodiment.

In FIGS. 1 and 19, units other than the operating system 14 constituted of software and the display panel 3 constituted of hardware may be constituted of software (a computer program) or hardware. Some units other than the operating system 14 and the display panel 3 may be constituted of software and the other units may be constituted of hardware. The way in which hardware and software are used is discretionary.

The present disclosure includes matters that contribute to the realization of "good health and well-being" of the SDGs and contribute to the creation of value through healthcare products and services.

What is claimed is:

1. A medical image display device comprising:
   a hardware or hardware and software image enlargement unit configured to enlarge a partial area of a pathology image displayed on a display panel;
   a hardware or hardware and software display area acquisition unit configured to acquire a display area indicating the partial area enlarged by the image enlargement unit;
   a hardware or hardware and software display area image generation unit configured to generate an enlarged map image in which an enlarged display area of the pathology image is drawn, based on the display area acquired by the display area acquisition unit;
   a hardware or hardware and software pointer position acquisition unit configured to acquire a position of a pointer that is superimposed on the pathology image and displayed;
   a hardware or hardware and software viewing position image generation unit configured to generate, as a viewing position map image, a pointer map image indicating a movement trajectory of when the pointer moves on the pathology image, based on the position of the pointer acquired by the pointer position acquisition unit; and
   a hardware or hardware and software image compositing unit configured to superimpose the enlarged map image and the viewing position map image on the pathology image.

2. The medical image display device according to claim 1, wherein the viewing position image generation unit draws the movement trajectory with a circle having a size that corresponds to a magnification percentage of the display area enlarged by the image enlargement unit.

3. The medical image display device according to claim 1, further comprising:

a map data a hardware or software map data presence determination unit, or a hardware or software map data absence determination unit, configured to divide the pathology image into a plurality of unit areas and to determine whether map data of the enlarged map image and map data of the viewing position map image are present for each unit area; and an a hardware or hardware and software enlargement instruction unit configured to instruct the image enlargement unit to sequentially enlarge unit areas in which the map data presence or map data absence determination unit determines that both or either one of the map data of the enlarged map image and the map data of the viewing position map image is present or not present.

* * * * *